(12) United States Patent
Cai et al.

(10) Patent No.: US 11,498,103 B2
(45) Date of Patent: Nov. 15, 2022

(54) COLD-EXTRUSION FORMING METHOD FOR UNSYMMETRICAL FERRULE BLANKS

(71) Applicant: ZHEJAING JINGLI BEARING TECHNOLOGY CO., LTD., Zhejiang (CN)

(72) Inventors: Zhengli Cai, Zhejiang (CN); Zhongsheng Wu, Zhejiang (CN); Pan Cai, Zhejiang (CN); Pulin Cai, Zhejiang (CN)

(73) Assignee: ZHEJAING JINGLI BEARING TECHNOLOGY CO., LTD., Zhejiang (CN)

(*) Notice: Subject to any disclaimer, the term of this patent is extended or adjusted under 35 U.S.C. 154(b) by 380 days.

(21) Appl. No.: 16/618,151

(22) PCT Filed: Apr. 28, 2018

(86) PCT No.: PCT/CN2018/085023
§ 371 (c)(1),
(2) Date: May 3, 2020

(87) PCT Pub. No.: WO2018/233377
PCT Pub. Date: Dec. 27, 2018

(65) Prior Publication Data
US 2020/0269299 A1 Aug. 27, 2020

(30) Foreign Application Priority Data

Jun. 23, 2017 (CN) .......................... 201710486134.2

(51) Int. Cl.
*B21C 23/08* (2006.01)
*B24C 1/10* (2006.01)

(52) U.S. Cl.
CPC .............. *B21C 23/085* (2013.01); *B24C 1/10* (2013.01); *Y10T 29/479* (2015.01); *Y10T 29/49671* (2015.01)

(58) Field of Classification Search
CPC ....... B21C 23/085; B24C 1/10; Y10T 29/479; Y10T 29/49671
See application file for complete search history.

(56) References Cited

U.S. PATENT DOCUMENTS

| 3,737,965 | A | * | 6/1973 | Knapp | F16C 33/64 29/DIG. 26 |
| 7,882,638 | B2 | * | 2/2011 | von Gynz-Rekowski | B21D 53/10 29/898.047 |
| 2004/0123465 | A1 | * | 7/2004 | Kuzuu | A45D 29/02 30/28 |

(Continued)

FOREIGN PATENT DOCUMENTS

| CN | 101947519 A | * | 1/2011 | ............. B21C 23/18 |
| CN | 103071690 A | | 5/2013 | |

(Continued)

OTHER PUBLICATIONS

English Machine Translation of CN-106623744-A, Wu et al., May 10, 2017.*

(Continued)

*Primary Examiner* — Sarang Afzali
(74) *Attorney, Agent, or Firm* — Global IP Services; Tianhua Gu

(57) ABSTRACT

A precise and efficient cold-extrusion forming method for an unsymmetrical ferrule blank, comprising pipe-cutting blanking, surface phosphorus saponification treatment, ferrule cold-extrusion forming, and turning post-treatment. In the step of surface phosphorus saponification treatment, firstly, shot blasting pretreatment is performed on the surface of a ferrule blank by using a shot blasting machine; and then, the process steps of washing, phosphorization, washing, saponi- (Continued)

fication, and drying are completed in sequence. In the step of ferrule cold-extrusion forming, automatic material feed is performed by using an automatic feeding machine, and the material is conveyed to a cold-extrusion punch press for cold-extrusion. The method features low equipment investment cost, short technological process, and low energy consumption.

8 Claims, 4 Drawing Sheets

(56) References Cited

U.S. PATENT DOCUMENTS

| | | | |
|---|---|---|---|
| 2015/0258600 A1* | 9/2015 | Zhou | F16L 15/00 72/70 |
| 2016/0336675 A1* | 11/2016 | Zhou | B21J 9/022 |

FOREIGN PATENT DOCUMENTS

| | | |
|---|---|---|
| CN | 104624831 A | 5/2015 |
| CN | 105880304 A | 8/2016 |
| CN | 206104577 U | 4/2017 |
| CN | 106623744 A | 5/2017 |
| CN | 107322238 A | 11/2017 |
| CN | 207143332 U | 3/2018 |
| JP | 1150080 A | 2/1999 |

OTHER PUBLICATIONS

English Machine Translation of CN-103071690-A, Li et al., May 1, 2013.*

English Machine Translation of CN-101947519-A, Xin, Jan. 19, 2011.*

* cited by examiner

COLD-EXTRUSION FORMING METHOD FOR UNSYMMETRICAL FERRULE BLANKS

CROSS REFERENCE TO RELATED PATENT APPLICATION

The present application is the US national stage of PCT/CN2018/085023 filed on Apr. 28, 2018, which claims the priority of the Chinese patent application No. 201710486134.2 filed on Jun. 23, 2017, which applications are incorporated herein by reference.

TECHNICAL FIELD

The present invention belongs to the technical field of cold-extrusion, relates to a method for machining a bearing ferrule, and in particular relates to a precise and efficient cold-extrusion forming method for an unsymmetrical ferrule blank.

BACKGROUND ART

Cold-extrusion is a machining method in which a metal blank is placed in a cold-extrusion die cavity, and a pressure is applied to the blank via a male die fixed on a press at room temperature so that the metal blank is plastically deformed to obtain a component. At present, in China, it has been possible to perform cold-extrusion for lead, tin, aluminum, copper, zinc and alloys thereof, low-carbon steel, medium-carbon steel, tool steel, low-alloy steel, stainless steel and other metal, and it is even possible to perform cold-extrusion for bearing steel, high-carbon and high-aluminum alloy tool steel, high-speed steel, etc. at a certain amount of deformation. In terms of extrusion equipment, China has the ability to design and manufacture extrusion presses of various tonnages. In addition to general mechanical presses, hydraulic presses and cold-extrusion presses, it is possible to successfully perform cold-extrusion production using friction presses and high-speed and high-energy equipment.

During cold-extrusion forming for metal, the contact pressure is high up to 2,000 MPa, and at the same time, the deformation of metal is also very high, and the surface area can be increased by 100%. Friction brings considerable difficulties to forming, while the wear of dies is also quite severe.

Thus, it is required to perform certain chemical treatment on a surface of a workpiece to form a good lubricating layer, thereby reducing the friction and improving the production efficiency. At present, a method of combining phosphate coating with a stearate lubricant is commonly used, the main technical process thereof mainly comprising procedures of "degreasing→pickling→washing→surface conditioning-→phosphating→washing→neutralization→saponification-→drying". The method has multiple complex procedures and long time of treatment. It is required to use strong acid and strong alkali in both pickling and neutralization procedures for a bearing ferrule blank, which is high in equipment investment and is inevitable to cause chemical leakage that causes environmental pollution. In addition, both pickling and neutralizing bath solutions need to be maintained at a certain temperature, which causes a long technical process and high energy consumption.

The ferrule blanks which have been treated by phosphating and saponification need to be subjected to feeding and blanking in a manual way. An operator puts the blanks to be extruded into a cold-extrusion die of a hydraulic press for extrusion, in which a production mode "one machine being operated by one person" is used to achieve the output of 3000-4000 pieces per shift, which is low in the processing efficiency and not high in degree of automation and will cause personal injury and thus have poor safety in the case where the material feeding is out of step with the stamping due to incorrect manipulation.

SUMMARY OF THE INVENTION

In view of the above problems, an object of the present invention is to provide a precise and efficient cold-extrusion forming method for an unsymmetrical ferrule blank.

In order to achieve the above object, the present invention uses the following technical solutions:

a precise and efficient cold-extrusion forming method for an unsymmetrical ferrule blank, the method comprising steps of pipe cutting and blanking, surface treatment by phosphating and saponification, cold-extrusion forming for a ferrule, and after-treatment by turning.

In the step of surface treatment by phosphating and saponification, a surface of a ferrule blank is firstly subjected to shot-blasting pretreatment with a shot-blasting machine and is then successively subjected to steps of washing, phosphating, washing, saponification and drying.

In the step of cold-extrusion forming for a ferrule, an automatic feeding machine is used for feeding, and the material is conveyed to a cold-extrusion punch press for cold-extrusion.

According to the above precise and efficient cold-extrusion forming method for the unsymmetrical ferrule blank, in the step of pipe cutting and blanking, a pipe is cut using a pipe cutter to obtain a ferrule blank, the pipe cutter being provided with a chamfering device by which chamfering is performed on inner and outer sides of a turned single face while cutting the pipe.

According to the above precise and efficient cold-extrusion forming method for the unsymmetrical ferrule blank, in the step of surface treatment by phosphating and saponification, a phosphating and saponification production line is used for the treatment, the phosphating and saponification production line comprising the shot-blasting machine, and a first cleaning tank, a phosphating tank, a second cleaning tank and a saponification tank which are sequentially arranged on a cleaning machine frame, in which the first cleaning tank is connected to the shot-blasting machine, and the saponification tank is connected to a drying elevating basket.

The ferrule blank is subjected to shot-blasting pretreatment with the shot-blasting machine, in which the ferrule blank is placed in the first cleaning tank for washing at 40-50° C. for 4 min, is then transferred into the phosphating tank for phosphating at 70-80° C. for 15 min, is then transferred into the second cleaning tank for washing at 40-50° C. for 4 min, and is then transferred into the saponification tank for saponification at 70-80° C. for 10 min; and then the ferrule blank is placed in the drying elevating basket for draining water and is conveyed into a dryer for drying.

According to the above precise and efficient cold-extrusion forming method for the unsymmetrical ferrule blank, a synchronization shaft is rotatably connected to the cleaning machine frame, the synchronization shaft is provided with four synchronization gears, and the first cleaning tank, the phosphating tank, the second cleaning tank and the saponification tank are respectively provided with a steering gear, each steering gear meshing with one of the synchronization gears.

According to the above precise and efficient cold-extrusion forming method for the unsymmetrical ferrule blank, the automatic feeding machine comprises a material hopper, the material hopper is connected to an elevator, the elevator is connected to a material tank, the material tank is located in the cold-extrusion punch press and is connected to a conveyor, an end of the conveyor is provided with a feeding station, one side of the feeding station is a cold-extrusion lower die and the other side is a disc material-conveying assembly, and an outer wall of the cold-extrusion punch press is provided with a transmission bevel gear assembly which can drive the disc material-conveying assembly to be close to or away from the feeding station so as to push a workpiece on the feeding station into the cold-extrusion lower die.

The transmission bevel gear assembly comprises a first transmission shaft and a second transmission shaft which are provided on the outer wall of the cold-extrusion punch press and mesh with each other, the first transmission shaft being horizontally arranged, and the second transmission shaft being vertically arranged.

The disc material-conveying assembly comprises a feeding frame, a disc, and a connecting rod rotatably connected to the disc, with one end, away from the disc, of the connecting rod being connected to a manipulator, an end of the manipulator being located at a position corresponding to the feeding station, the disc being arranged on the feeding frame and rotatably connected to the feeding frame, and the manipulator being slidably connected to the feeding frame.

According to the above precise and efficient cold-extrusion forming method for the unsymmetrical ferrule blank, two ends of the first transmission shaft are respectively provided with one first bevel gear; one end, close to the first transmission shaft, of the second transmission shaft is provided with a second bevel gear, and the second bevel gear meshes with the adjacent first bevel gear; the first bevel gear, away from the second transmission shaft, of the first transmission shaft meshes with a third bevel gear, and the third bevel gear is fixed to a third transmission shaft; the third transmission shaft passes through the cold-extrusion punch press and is then connected to an electric motor in the cold-extrusion punch press; and one end, away from the first transmission shaft, of the second transmission shaft is provided with a torsion combiner, and the torsion combiner is connected to the disc.

According to the above precise and efficient cold-extrusion forming method for the unsymmetrical ferrule blank, the outer wall of the cold-extrusion punch press is provided with a first positioning plate and a second positioning plate, the first transmission shaft and the second transmission shaft are respectively rotatably connected to the first positioning plate and the second positioning plate, an upper surface of the feeding frame is provided with a guide rail, a sliding block is slidably connected to the guide rail, the manipulator is fixed to the sliding block, and two ends of the connecting rod are respectively rotatably connected to the disc and the sliding block.

According to the above precise and efficient cold-extrusion forming method for the unsymmetrical ferrule blank, an end of the feeding station is provided with a positioning stop block, an end of the manipulator is provided with a push plate, the manipulator is of an arc shape, the manipulator passes by stop strips on two sides of the feeding station and is then located above a the stop strips, and the push plate is located on the feeding station.

According to the above precise and efficient cold-extrusion forming method for the unsymmetrical ferrule blank, the horizontal height of an upper surface of the cold-extrusion lower die is not higher than that of an upper surface of the feeding station, the conveyor is a chain conveyor and is horizontally arranged, and the material tank is obliquely arranged from high to low in a direction from the elevator to the conveyor.

According to the above precise and efficient cold-extrusion forming method for the unsymmetrical ferrule blank, one end, away from the first transmission shaft, of the second transmission shaft is provided with a planetary gear, an outer wall of the torsion combiner is provided with a rack that matches the planetary gear, the planetary gear meshes with the torsion combiner, and the torsion combiner is located directly below the disc and fixedly connected to the disc.

Compared with the prior art, the advantages of the present invention are as follows:

1. Based on the design idea of a short process, the phosphating and saponification treatment process in the prior art "degreasing→pickling→washing→surface conditioning→phosphating→washing→neutralization→saponification→drying" is shortened to "shot-blasting→washing→phosphating→washing→saponification→drying", which is low in equipment investment cost, is short in technical process and is low in energy consumption.

2. The phosphating and saponification production line has an environmentally friendly design, in which "pickling" is replaced with "shot-blasting", and the procedures "degreasing", "surface conditioning", "neutralization", etc. are omitted, avoiding the environmental pollution caused by waste liquid and other chemical agents from pickling, neutralization, phosphating, etc.; and secondly, the production line can decrease the temperature of a liquid bath reaction environment, thereby reducing the energy consumption of the phosphating and saponification process while ensuring the phosphating effect.

3. A full-automatic feeding structure is designed, in which a disc material-conveying assembly is driven by a transmission bevel gear assembly to rotate to complete the material-conveying process. Compared with electrical sensing, moving cylinder and other methods, the structure is simple and reliable, has no need of additionally providing an electric circuit, a gas circuit and other additional devices, and is low in modification cost for a punch press.

4. The disc material-conveying assembly is simple in structure and is reliable in working process, and turning the disc one circle can complete one feeding procedure, thus achieving synchronization with the cold-extrusion punch press.

Figure 1:
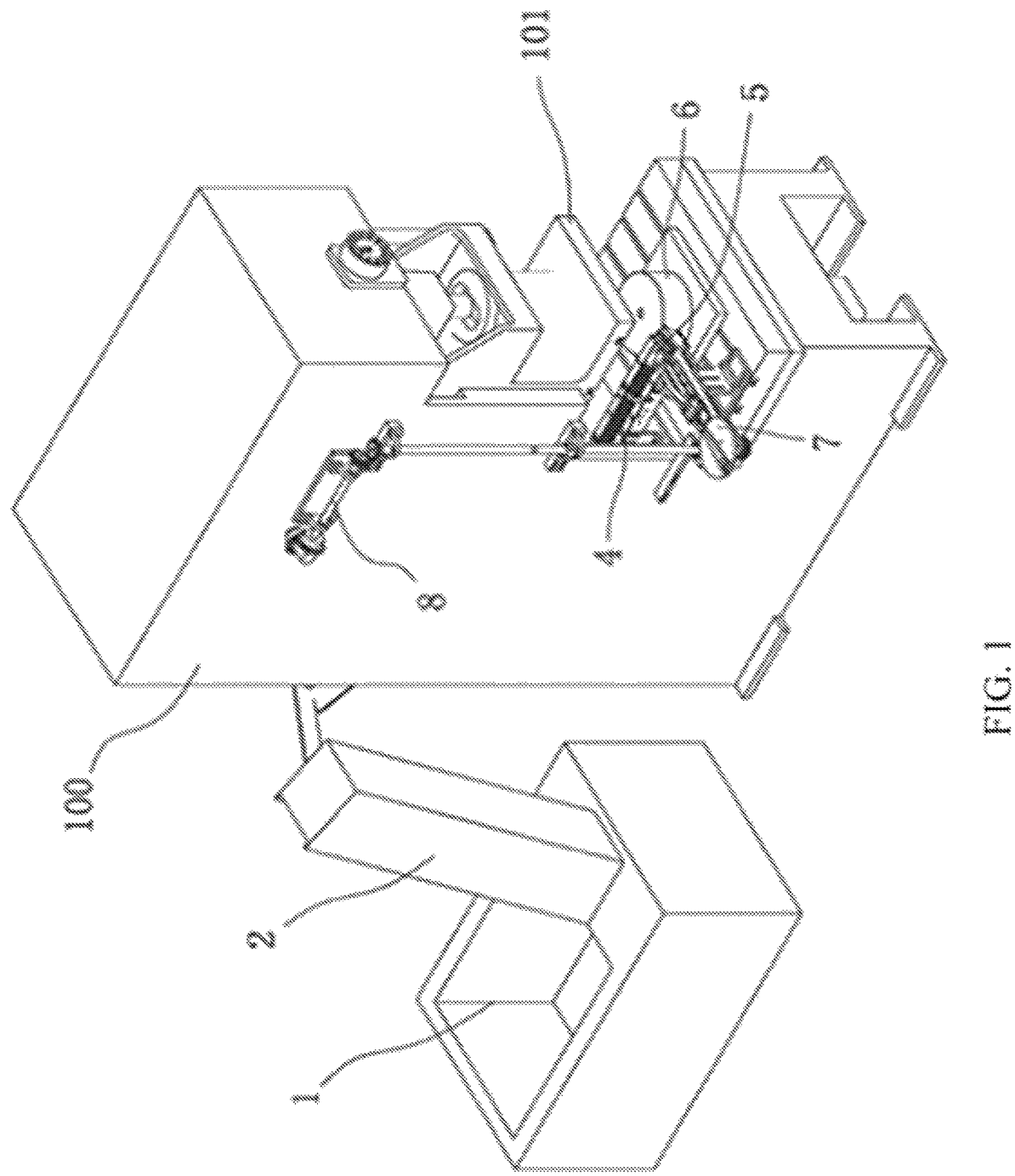
FIG. 1 is a working principle diagram of an automatic feeding machine.

In the figures, material hopper 1, elevator 2, material tank 3, conveyor 4, feeding station 5, cold-extrusion lower die 6, disc material-conveying assembly 7, transmission bevel gear assembly 8, first transmission shaft 9, second transmission shaft 10, feeding frame 11, disc 12, connecting rod 13, manipulator 14, first bevel gear 15, second bevel gear 16, third bevel gear 17, third transmission shaft 18, torsion combiner 19, first positioning plate 20, second positioning plate 21, guide rail 22, sliding block 23, push plate 24, stop strip 25, positioning stop block 26, shot-blasting machine 30, conveyor 30a, cleaning machine frame 31, first cleaning tank 32, phosphating tank 33, second cleaning tank 34, saponification tank 35, drying elevating basket 36, synchronization shaft 37, synchronization gear 38, steering gear 39, cold-extrusion punch press 100, cold-extrusion upper die 101, and rack 102.

DETAILED DESCRIPTION OF EMBODIMENTS

A precise and efficient cold-extrusion forming method for an unsymmetrical ferrule blank, the method comprising
steps of pipe cutting and blanking, surface treatment by phosphating and saponification, cold-extrusion forming for a ferrule, and after-treatment by turning, wherein
in the step of surface treatment by phosphating and saponification, a surface of a ferrule blank is firstly subjected to shot-blasting pretreatment with a shot-blasting machine and is then successively subjected to steps of washing, phosphating, washing, saponification and drying.

In the step of cold-extrusion forming for a ferrule, an automatic feeding machine is used for feeding, and the material is conveyed to a cold-extrusion punch press for cold-extrusion.

In the step of pipe cutting and blanking, a pipe is cut using a pipe cutter to obtain a ferrule blank, the pipe cutter being provided with a chamfering device by which chamfering is performed on inner and outer sides of a turned single face while cutting the pipe.

Figure 4:
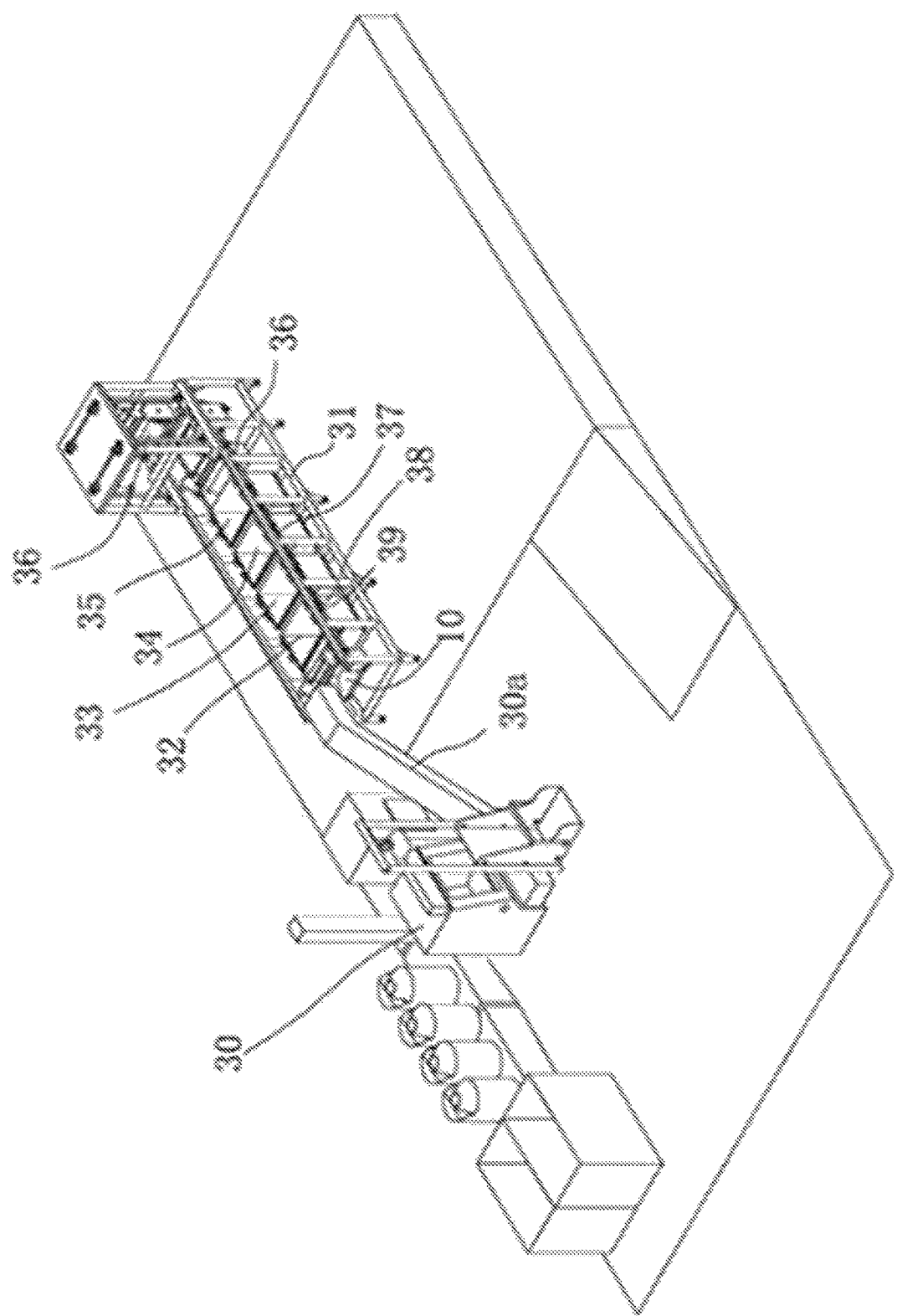
FIG. 4 is a schematic structural diagram of a phosphating and saponification production line.

In the step of surface treatment by phosphating and saponification, a phosphating and saponification production line is used for treatment. As shown in FIG. 4, the phosphating and saponification production line comprises a shot-blasting machine 30, and a first cleaning tank 32, a phosphating tank 33, a second cleaning tank 34 and a saponification tank 35 which are sequentially arranged on a cleaning machine frame 31, the first cleaning tank 32 being connected to the shot-blasting machine 30, and the saponification tank 35 being connected to a drying elevating basket 36.

The ferrule blank is subjected to shot-blasting pretreatment with the shot-blasting machine 30, in which the ferrule blank is placed in the first cleaning tank 32 for washing at 40-50° C. for 4 min, is then transferred into the phosphating tank 33 for phosphating at 70-80° C. for 15 min, is then transferred into the second cleaning tank 34 for washing at 40-50° C. for 4 min, is then transferred into the saponification tank 35 for saponification at 70-80° C. for 10 min; and then the ferrule blank is placed in the drying elevating basket 36 for draining water and is conveyed into a dryer for drying.

The shot-blasting machine 30 is connected to the first cleaning tank 32 via a conveyor 30a, several drying elevating baskets 36 are provided and can circumferentially rotate along the cleaning machine frame 31, and several drying elevating baskets 36 may be provided, with the bottom thereof being provided with a hollowed-out part for draining water.

A synchronization shaft 37 is rotatably connected to the cleaning machine frame 31, the synchronization shaft 37 is provided with four synchronization gears 38, and the first cleaning tank 32, the phosphating tank 33, the second cleaning tank 34 and the saponification tank 35 are respectively provided with a steering gear 39, each steering gear 39 meshing with one of the synchronization gears 38.

Those skilled in the art should understand that the steering gears 39 can be fixed to the rotating shafts, and for the rotating shafts, that is, each steering gear 39 corresponds to one of the rotating shafts, the four rotating shafts are respectively fixedly connected to the first cleaning tank 32, the phosphating tank 33, the second cleaning tank 34 and the saponification tank 35, and the rotating shaft is rotatably connected to the cleaning machine frame 31, so that when the synchronization shaft 37 rotates, the synchronization gear 38 drives the steering gear 39 to rotate, the steering gear 39 drives the rotating shaft to rotate, and the first cleaning tank 32, the phosphating tank 33, the second cleaning tank 34 and the saponification tank 35 turn over at the same time to discard waste liquids.

Compared with the prior art, the phosphating and saponification production line has an environmentally friendly design, in which "pickling" is replaced with "shot-blasting", and the procedures "degreasing", "surface conditioning", "neutralization", etc. are omitted, avoiding the environmental pollution caused by waste liquid and other chemical agents from pickling, neutralization, phosphating, etc.; and secondly, the production line can decrease the temperature of a liquid bath reaction environment, thereby reducing the energy consumption of the phosphating and saponification process while ensuring the phosphating effect.

Figure 2:
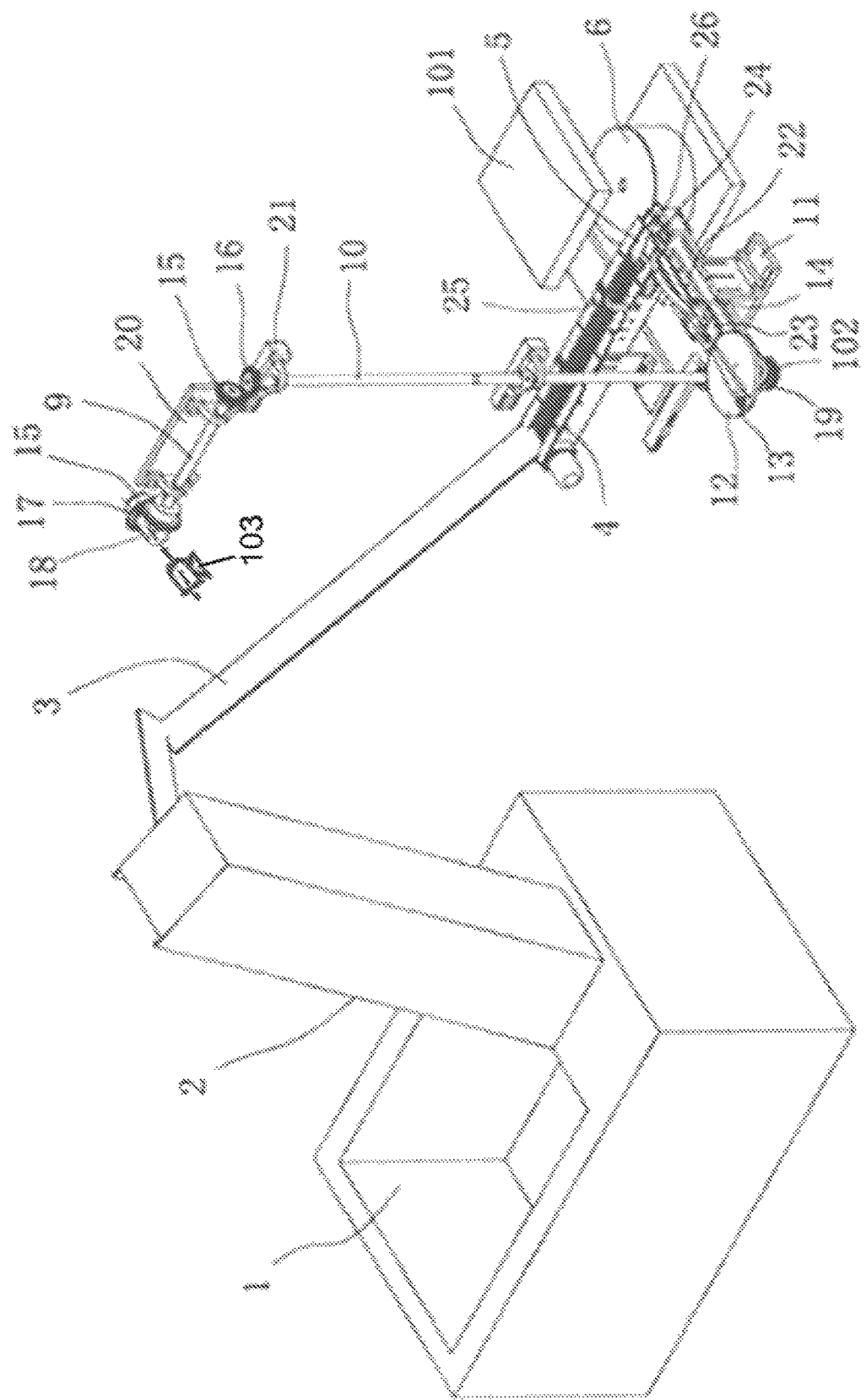
FIG. 2 is a schematic structural diagram of the automatic feeding machine.
Figure 3:
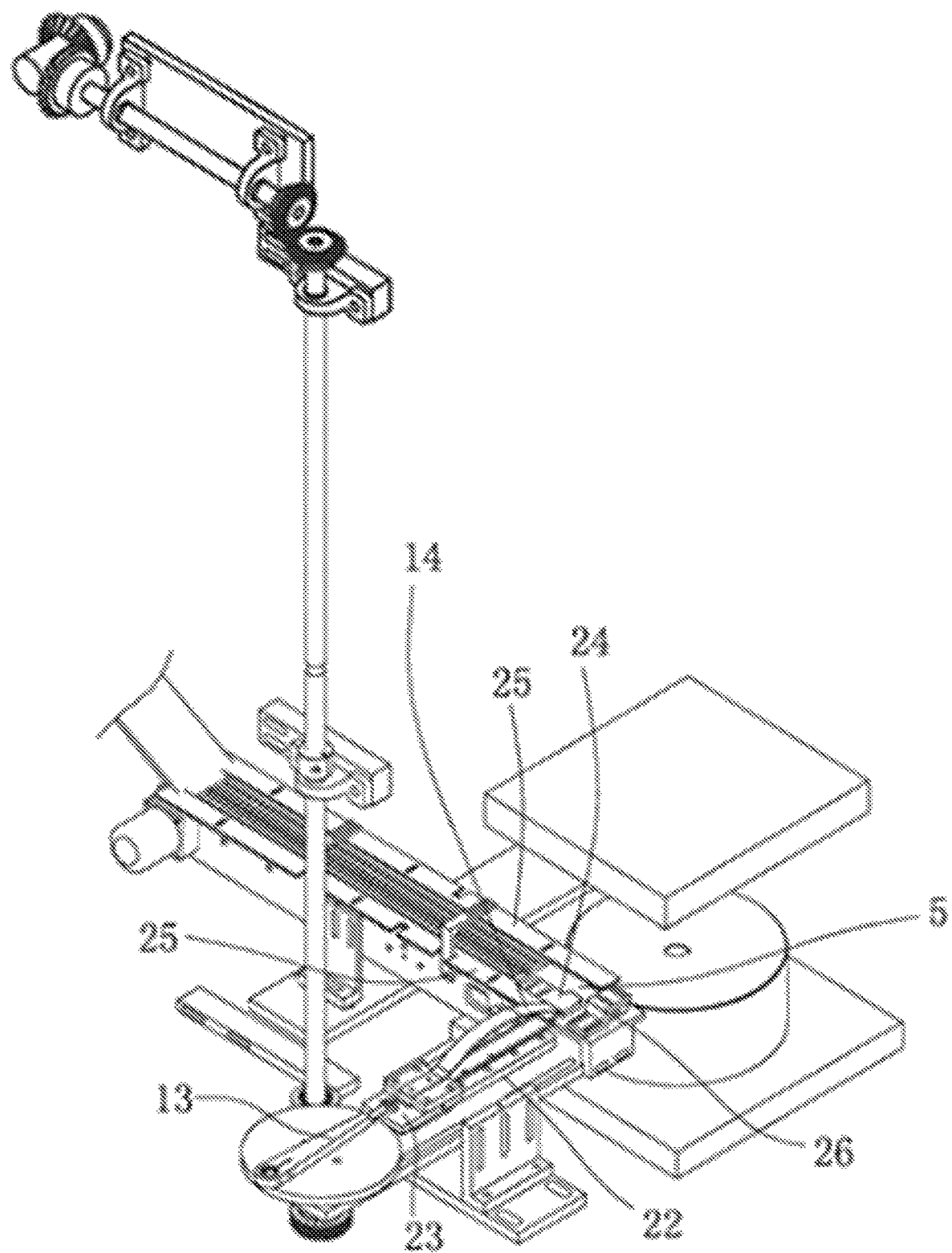
FIG. 3 is a schematic structural diagram of the automatic feeding machine with a material hopper removed.

As shown in FIGS. 1-3, the automatic feeding machine comprises a material hopper 1 for storing a ferrule blank, the material hopper 1 is connected to an elevator 2, the elevator 2 is a chain-plate elevator, the elevator 2 is connected to a material tank 3 to convey the ferrule blank to the material tank 3, the material tank 3 is located inside the cold-extrusion punch press 100 and is connected to a conveyor 4, the conveyor 4 is a chain conveyor or a belt conveyor, an end of the conveyor 4 is provided with a feeding station 5, the ferrule blank is conveyed to the feeding station 5 by the conveyor 4, one side of the feeding station 5 is a cold-extrusion lower die 6 and the other side thereof is a disc material-conveying assembly 7, and an outer wall of the cold-extrusion punch press 100 is provided with a transmission bevel gear assembly 8 which can drive the disc material-conveying assembly 7 to be close to or away from the feeding station 5 so as to push a workpiece on the feeding station 5 into the cold-extrusion lower die 6. After the disc material-conveying assembly 7 actuates, the ferrule blank on the feeding station 5 is conveyed into the cold-extrusion lower die 6, and the cold-extrusion upper die 101 on the cold-extrusion punch press 100 actuates for cold-extrusion on the ferrule blank.

Those skilled in the art should understand that the transmission bevel gear assembly 8 is a transmission structure and functions to drive the disc material-conveying assembly 7 to move in a reciprocating motion in a horizontal direction so as to push the ferrule blank on the feeding station 5, that is, one action of the disc material-conveying assembly 7 pushes one ferrule blank into the cold-extrusion lower die 6; and the transmission bevel gear assembly 8 is a mechanical mechanism, which has no need of electric control and has no need of additionally providing an electric circuit, a gas circuit and other additional devices, and thus having a simple structure, being low in modification cost for the cold-extrusion punch press 100, having good stability, and being reliable in the working process.

Obviously, those skilled in the art could also use a cylinder to push the disc material-conveying assembly 7, however, it needs to additionally provide a gas circuit, and the cylinder is prone to fatigue due to reciprocating action.

Those skilled in the art should also understand that the horizontal height of an upper surface of the cold-extrusion lower die 6 is not higher than that of an upper surface of the feeding station 5, that is, the two may be in parallel, or the horizontal height of the cold-extrusion lower die 6 is slightly lower, and in this way, the ferrule blank on the feeding station 5 can be smoothly pushed onto the cold-extrusion lower die 6.

The conveyor 4 is the prior art and is preferably a circulating conveyor. In this embodiment, the conveyor 4 is a chain conveyor and is horizontally arranged, the material tank 3 is obliquely arranged from high to low in a direction from the elevator 2 to the conveyor 4. The elevator 2 conveyed the ferrule blanks to the top of the material tank 3, the ferrule blanks on the material tank 3 successively slide down and are arranged in order on the material tank 3. The width of the material tank 3 should match the outer diameter of the ferrule blank and should be slightly greater than the outer diameter of the ferrule blank but less than the outer diameter of the two ferrule blanks.

In this embodiment, as shown in FIGS. 2 and 3, the transmission bevel gear assembly 8 comprises a first transmission shaft 9 and a second transmission shaft 10 which are provided on the outer wall of the cold-extrusion punch press 100 and mesh with each other, the first transmission shaft 9 being horizontally arranged, and the second transmission shaft 10 being vertically arranged.

The disc material-conveying assembly 7 comprises a feeding frame 11, a disc 12, and a connecting rod 13 rotatably connected to the disc 12, with one end, away from the disc 12, of the connecting rod 13 being connected to a manipulator 14, an end of the manipulator 14 being located at a position corresponding to the feeding station 5, the disc 12 being arranged on the feeding frame 11 and rotatably connected to the feeding frame 11, and the manipulator 14 being slidably connected to the feeding frame 11.

The specific structure of the transmission bevel gear assembly 8 is as shown in FIG. 3, in which two ends of the first transmission shaft 9 are respectively provided with one first bevel gear 15; one end, close to the first transmission shaft 9, of the second transmission shaft 10 is provided with a second bevel gear 16, and the second bevel gear 16 meshes with the adjacent first bevel gear 15; the first bevel gear 15, away from the second transmission shaft 10, of the first transmission shaft 9 meshes with a third bevel gear 17, and the third bevel gear 17 is fixed to a third transmission shaft 18; the third transmission shaft 18 passes through the cold-extrusion punch press 100 and is then connected to an electric motor (not shown in the figure) in the cold-extrusion punch press 100; and one end, away from the first transmission shaft 9, of the second transmission shaft 10 is provided with a torsion combiner 19, and the torsion combiner 19 is connected to the disc 12.

The outer wall of the cold-extrusion punch press 100 is provided with a first positioning plate 20 and a second positioning plate 21, the first transmission shaft 9 and the second transmission shaft 10 are respectively rotatably connected to the first positioning plate 20 and the second positioning plate 21. The first positioning plate 20 and the second positioning plate 21 are respectively fixedly connected to the outer wall of the cold-extrusion punch press 100, and the first transmission shaft 9 and the second transmission shaft 10 may be respectively provided with a bearing and rotatably connected to the first positioning plate 20 and the second positioning plate 21.

An upper surface of the feeding frame 11 is provided with a guide rail 22, a sliding block 23 is slidably connected to the guide rail 22, the manipulator 14 is fixed to the sliding block 23, and two ends of the connecting rod 13 are respectively rotatably connected to the disc 12 and the sliding block 23. When the disc 12 rotates, the connecting end between the connecting rod 13 and the disc 12 synchronously rotates with the disc 12. When the connecting end rotates from a distal end to a proximal end, a connecting end between the connecting rod 13 and the sliding block 23 pushes the sliding block 23 to be close to the feeding station 5, and the manipulator 14 pushes the ferrule blank on the feeding station 5 into the cold-extrusion lower die. On the contrary, when the connecting end between the connecting rod 13 and the disc 12 rotates from the proximal end to the distal end, the connecting rod 13 pulls the sliding block and the manipulator to return, and the disc 12 turns a circle to push one ferrule blank into the cold-extrusion lower die.

One end, away from the first transmission shaft 9, of the second transmission shaft 10 is provided with a planetary gear, an outer wall of the torsion combiner 19 is provided with a rack 102 that matches the planetary gear (not shown in the figure), the planetary gear meshes with the torsion combiner 19, and the torsion combiner 19 is located directly below the disc 12 and fixedly connected to the disc 12. When the second transmission shaft 10 rotates, the planetary gear is driven to rotate, the manipulator drives the torsion combiner 19 to rotate, and the torsion combiner 19 drives the disc to rotate.

An end of the feeding station 5 is provided with a positioning stop block 26, and an end of the manipulator 14 is provided with a push plate 24. The manipulator 14 is of an arc shape, the manipulator passes by stop strips 25 on two sides of the feeding station 5 and is then located above the stop strips, and the push plate 24 is located on the feeding station 5. The manipulator 14 is an arc-shaped plate, has certain elasticity, and can maintain a good buffering function during pushing the ferrule blank to cause no damage to the ferrule blank.

The working process of the present invention is as follows:

ferrule blanks are placed in the material hopper 1, the elevator 2 conveys the ferrule blanks to the top of the material tank 3, the ferrule blanks sequentially slide downwards along the material tank 3 to cover the whole material tank 3 and are conveyed by the conveyor 4 to cover the whole rail of the conveyor 4, and thus the first ferrule blank is pushed onto the feeding station 5 and is positioned on the feeding station 5 by the positioning stop block 26.

The third transmission shaft 18 rotates to drive the first transmission shaft 9 and the second transmission shaft 10 to rotate. During rotation of the second transmission shaft 10, the torsion combiner 19 is driven via the planetary gear to rotate, and the torsion combiner 19 drives the disc 12 to rotate. During rotation of the disc 12, one end, connected to the sliding block 23, of the connecting rod 13 moves in a reciprocating motion in a horizontal direction, that is, the connecting rod 13 pushes the sliding block 23 to move along the guide rail 22 to further push the manipulator 14 and the push plate 24 to move in a reciprocating motion so as to push the ferrule blank on the feeding station 5 into the cold-extrusion lower die 6. Turning the disc one circle completes feeding one ferrule blank.

The specific embodiments described herein are merely illustrative for the spirit of the present invention. Those skilled in the art would have been able to make various modifications or supplements to the specific embodiments described above or make substitutions in similar manners, without departing from the spirit of the present invention or going beyond the scope defined in the appended claims.

Although the terms, including material hopper 1, elevator 2, material tank 3, conveyor 4, feeding station 5, cold-extrusion lower die 6, disc material-conveying assembly 7, transmission bevel gear assembly 8, first transmission shaft 9, second transmission shaft 10, feeding frame 11, disc 12, connecting rod 13, manipulator 14, first bevel gear 15, second bevel gear 16, third bevel gear 17, third transmission shaft 18, torsion combiner 19, first positioning plate 20, second positioning plate 21, guide rail 22, sliding block 23, push plate 24, stop strip 25, cold-extrusion punch press 100, cold-extrusion upper die 101, rack 102, etc. are frequently used herein, the possibility of using other terms is not excluded. These terms are only used for describing and explaining the nature of the present invention more conveniently, and it is contrary to the spirit of the present invention to construing the terms as any additional limitation.

What is claimed is:

1. A cold-extrusion forming method for unsymmetrical ferrule blanks, the method comprising:
   step 1, cutting a metal pipe to obtain a plurality of ferrule blanks:
   step 2, surface treating the ferrule blanks by first subjecting a surface of the ferrule blanks to a shot-blasting pretreatment and then successively subjecting the shot-blasted ferrule blanks to steps of washing, phosphating, washing, saponification and drying;
   step 3, cold extruding the surface treated ferrule blanks to become unsymmetrical ferrule blanks; wherein the cold extruding is performed by a device for cold extrusion, the device comprising:
   an automatic feeding means, which comprises a material hopper (1), the material hopper (1) is connected to an elevator (2), the elevator (2) is connected to a material tank (3), the material tank (3) is connected to a conveyor (4), an end of the conveyor (4) is provided with a feeding station (5), one side of the feeding station (5) is a cold extrusion lower die (6) and the other side is a disc material-conveying assembly (7), and an outer wall of a cold extrusion punch press (100) is provided with a transmission bevel gear assembly (8) which drives the disc material-conveying assembly (7) to be close to or away from the feeding station (5) so as to push the ferrule blank on the feeding station into the cold extrusion lower die (6);
   the transmission bevel gear assembly (8) comprises a first transmission shaft (9) and a second transmission shaft (10) which are provided on the outer wall of the cold extrusion punch press (100) and mesh with each other, the first transmission shaft (9) being horizontally arranged, and the second transmission shaft (10) being vertically arranged;
   and the disc material-conveying assembly (7) comprises a feeding frame (11), a disc (12), and a connecting rod (13) rotatably connected to the disc (12), with one end, away from the disc (12), of the connecting rod (13) being connected to a manipulator (14), an end of the manipulator (14) being located at a position corresponding to the feeding station (5), the disc (12) being arranged on the feeding frame (11) and rotatably connected to the feeding frame (11), and the manipulator (14) being slidably connected to the feeding frame (11).

2. The cold-extrusion forming method for unsymmetrical ferrule blanks according to claim 1, wherein the step 1 of cutting a metal pipe further includes chamfering inner and outer sides of a turned single face while cutting the metal pipe.

3. The cold: extrusion forming method for unsymmetrical ferrule blanks according to claim 1, wherein in the step 2 the surface treating is performed in a phosphating and saponification production line, the phosphating and saponification production line comprising a shot-blasting machine (30), a first cleaning tank (32), a phosphating tank (33), a second cleaning tank (34) and a saponification tank (35) which are sequentially arranged on a cleaning machine frame (31), in which the first cleaning tank (32) is connected to the shot-blasting machine (30), and the saponification tank (35) is connected to a drying elevating basket (36); and
   the ferrule blanks are subjected to shot-blasting pretreatment with the shot-blasting machine (30), in which the ferrule blanks are placed in the first cleaning tank (32) for washing at a temperature in a range of 40-50° C. for a duration of 4 minutes, are then transferred into the phosphating tank (33) for phosphating at a temperature in a range of 70-80° C. for a duration of 15 minutes, are then transferred into the second cleaning tank (34) for washing at a temperature in a range of 40-50° C. for a duration of 4 minutes, and are then transferred into the saponification tank (35) for saponification at a temperature in a range of 70-80° C. for a duration of 10 minutes; and then the ferrule blanks are placed in the drying elevating basket (36) for draining water and are conveyed into a dryer for drying.

4. The cold-extrusion forming method for unsymmetrical ferrule blanks according to claim 3, wherein a synchronization shaft (37) is rotatably connected to the cleaning machine frame (31), the synchronization shaft (37) is provided with four synchronization gears (38), and the first cleaning tank (32), the phosphating tank (33), the second cleaning tank (34) and the saponification tank (35) are each respectively provided with a steering gear (39), each steering gear (39) meshing with one of the synchronization gears (38).

5. The cold-extrusion forming method for unsymmetrical ferrule blanks according to claim 1, wherein two ends of the first transmission shaft (9) are respectively provided with one first bevel gear (15); one end, close to the first transmission shaft (9), of the second transmission shaft (10) is provided with a second bevel gear (16), and the second bevel gear (16) meshes with the adjacent first bevel gear (15); the first bevel gear (15), away from the second transmission shaft (10), of the first transmission shaft (9) meshes with a third bevel gear (17), and the third bevel gear (17) is fixed to a third transmission shaft (18); the third transmission shaft (18) passes through the cold extrusion punch press (100) and is then connected to an electric motor (103) in the cold extrusion punch press (100); and one end, away from the first transmission shaft (9), of the second transmission shaft (10) is provided with a torsion combiner (19), and the torsion combiner (19) is connected to the disc (12).

6. The cold-extrusion forming method for unsymmetrical ferrule blanks according to claim 5, wherein the outer wall of the cold extrusion punch press (100) is provided with a first positioning plate (20) and a second positioning plate (21), the first transmission shaft (9) and the second transmission shaft (10) are respectively rotatably connected to the first positioning plate (20) and the second positioning plate (21), an upper surface of the feeding frame (11) is provided with a guide rail (22), a sliding block (23) is slidably connected to the guide rail (22), the manipulator (14) is fixed to the sliding block (23), and two ends of the connecting rod (13) are respectively rotatably connected to the disc (12) and the sliding block (23).

7. The cold extrusion forming method for unsymmetrical ferrule blanks according to claim 6, wherein an end of the feeding station (5) is provided with a positioning stop block (26), an end of the manipulator (14) is provided with a push plate (24), the manipulator (14) passes by stop strips (25) on two sides of the feeding station (5) and is then located above the stop strips (25), and the push plate 24 is located on the feeding station (5).

8. The cold-extrusion forming method for unsymmetrical ferrule blanks according to claim 7, wherein a horizontal height of an upper surface of the cold extrusion lower die (6) is not higher than that of an upper surface of the feeding station (5), the conveyor (4) is a chain conveyor and is horizontally arranged, and the material hopper (1) is obliquely arranged from high to low in a direction from the elevator (2) to the conveyor (4).

* * * * *